April 27, 1954  J. H. BOWERS  2,676,567
VACUUM WATERING SYSTEM
Filed June 15, 1951

INVENTOR.
Joseph H. Bowers
BY
A. Hiram Sturges

Patented Apr. 27, 1954

2,676,567

UNITED STATES PATENT OFFICE 2,676,567

VACUUM WATERING SYSTEM

Joseph H. Bowers, Wahoo, Nebr.

Application June 15, 1951, Serial No. 231,771

1 Claim. (Cl. 119—77)

This invention relates to watering of stock and more particularly it is an object of this invention to provide an automatic mechanism for stock watering.

In the past there has been considerable difficulty encountered in the use of floats and valves in stock-watering troughs because these valves tend to slime up and leak, permitting all of the water in a supply tank to run out at once. Sometimes the float sticks to the drinking bowl, either in an upward or downward position. Such valves can also slime shut, permitting no water to run out. The float controlling these valves can be caused to operate improperly by mud collecting in the water bowl and also can be stuck to parts of the drinking bowl by slime.

At other times some pieces of straw or dirt can get in the valve holding it open.

A further disadvantage of stock watering systems now in use is in that the supply tank must be protected from freezing. This is usually done by having a source of heat in close proximity to the supply tank. When fuel and flame are used for heating there is always the danger that the flame will go out or that the fuel will become exhausted.

It is therefore an object of this invention to provide a stock watering system the main supply tank of which is protected from freezing by being covered by manure or other insulation material.

A particular object of this invention is in the use of manure for covering the tank. Manure generates heat, as is well known, as it decomposes.

A further object of the invention is to provide a stock watering system which is free from the disadvantages above mentioned.

Yet a further and a principal object of the invention is to provide a watering system which utilizes a vacuum created in the main reservoir controlling the level of liquid in the drinking bowl.

Another object of the invention is to provide electrical heating means for use with the stock watering system above described, which means is adapted to keep water in the drinking bowl from freezing, as well as to further protect the supply pipe leading from the storage tank to the drinking bowl.

Still another object is to provide a stock-watering system which is adapted to operate with a minimum of attention both in summer and in winter.

Still a further object is to provide a watering system as described having an air inlet supply pipe which extends upwardly above the main portion of the supply tank into an upwardly protruding nipple whereby the upper end of the air pipe is prevented from becoming clogged with water so that after filling the supply tank and releasing the plug in the drinking fountain enough water will always run out into the drinking bowl to prevent locking the vacuum in the supply tank by clogging the upper end of the air pipe by permitting water to enter the upper end of the supply tank and to prevent water from covering the upper end of the air line because as it covers the upper end of the air line it will block the air from coming in to break the vacuum.

Another object of the invention is to provide a cap for the upper end of the air line receiving the protrusion just mentioned, the cap having a handle attached thereto for convenience of opening or closing.

Another object of the invention is to provide a stock watering system having its supply tank insulated to keep water therein cool in the summertime.

Yet another object of the invention is to provide a device for the purpose described which is sturdy and durable in construction, reliable and efficient in operation, and relatively simple and inexpensive to manufacture, assemble, and utilize.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

Figure 1:
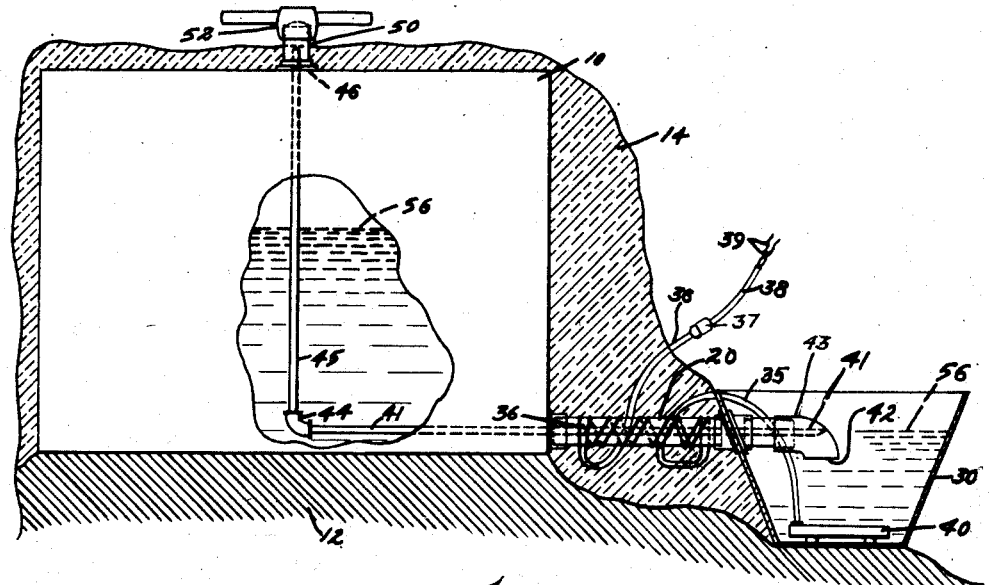
Figure 1 is a side elevation of the vacuum watering system shown with a portion of the drinking bowl broken away and a remainder showing in section, portions of the insulation and ground being also broken away and the remainder showing in section. A portion of the side of the tank is broken away for showing the water therein.
Figure 2:
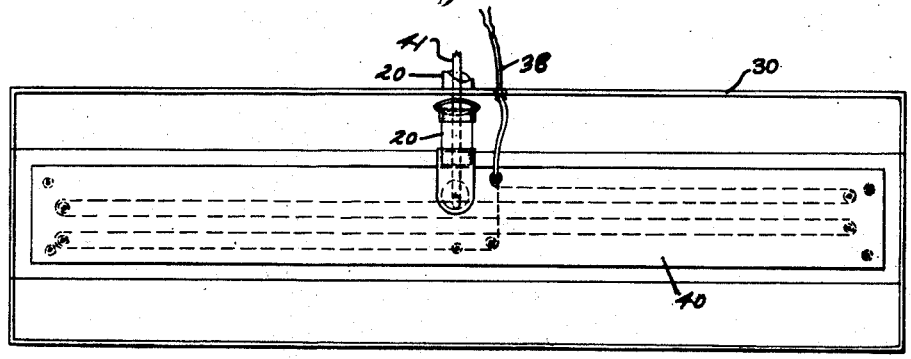
Figure 2 is a top plan view of the drinking bowl of this invention.

In Figure 1 the main supply tank or barrel is shown at 10 supported on the ground 12 and covered over by manure or other insulation 14. The supply tank 10 has an outlet pipe 20 secured thereto which extends outwardly from the bottom of the end thereof. The pipe 20 extends outwardly to a drinking bowl 30.

The drinking bowl 30 is spaced apart from the tank 10 a distance sufficient for a fence, not shown, to be disposed between the drinking bowl 30 and the tank 10 so that the tank 10 can be disposed on the outside of a stock area while the drinking bowl 30 is on the inside. Another reason for the bowl 30 being spaced away from the tank 10 is so that there is room to place the manure or other insulation 14 around the pipe 20.

The outlet pipe 20 is wrapped with two electrical heating wires 35 that extend from the supply tank 10 to the drinking bowl 30, the wires 35 being from a cord 36 attached by a plug 37 to a lead-in cord 38 having two wires 39. A heating element 40 is disposed in the bottom of the drinking bowl 30.

A pipe of smaller diameter 41 than the inside diameter of the outlet pipe 20 which may be called the air supply tube is disposed within the outlet pipe 20 and extends from the center of the supply tank 10 outward through the outlet pipe 20 and terminates at a point higher than the outlet 42 of the elbow 43 on the end of the pipe 20, when the outlet 42 of the elbow 43 is downturned.

The lower end of the air supply tube 41 has a bevel cut at its end so that air can enter the tube 41 with maximum freedom unhampered by the elbow 44. The lower end of the pipe 41 extends substantially to, or may touch, the inner side of the wall of the elbow 44. The elbow 44 can be rotated because of its threaded connection with the pipe 20 whereby the outlet 42 of the elbow 44 can be swung into a position opening upwardly for the insertion of a plug therein at times when the main supply tank 10 is being filled.

Also the elbow 44 can be swung upwardly or downwardly to selectively position the outlet 42 whereby the water height in the trough 30 can be controlled selectively.

It will be seen that the lower end of the air pipe 41 is in communication with the interior of the trough 30 through the opening 42 in the elbow.

The air supply tube 41 is attached by an elbow 44 to an upwardly extending tube section 45. The section 45 extends upwardly through an opening 46 in the top of the supply tank 10.

The opening 46 is in communication with an upwardly protruding nipple 50 having a cap 52, whereby the upper end of the air supply tube is prevented from becoming clogged with water so that after filling the supply tank and releasing the plug in the drinking fountain, water 56 will run out of the supply tank 10 through the outlet pipe 20 into the drinking bowl 30 until the water reaches a level higher than the effective outlet of the air supply tube 41, the effective outlet being the outlet 42 of the elbow 43. At that time no more air will be permitted to enter the supply tank, thereby holding the water in the supply tank until the level is again below the effective outlet 42 of the air supply tube 40.

From the foregoing description, it is thought to be obvious that a vacuum watering system constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

A stock watering device comprising a reservoir, a drinking bowl, the said drinking bowl being disposed below said reservoir and spaced a substantial distance therefrom, a pipe connecting said reservoir and said drinking bowl for the flow of water from said reservoir through said pipe into said drinking bowl, a second pipe extending through said first pipe and having one end disposed inside said drinking bowl and spaced upwardly from the bottom thereof, the other end of said second pipe extending into said reservoir and into an upper portion of said reservoir for delivering air through said second pipe to the upper portion of said reservoir, whereby air flows through said second pipe into said reservoir only at times when the level of drinking water in said drinking bowl is beneath the drinking bowl end of said second pipe, said reservoir having a filling pipe at the upper end thereof through which water can be placed into the reservoir and the reservoir end of said second pipe extending upwardly into said filling pipe.

References Cited in the file of this patent

UNITED STATES PATENTS

| Number | Name | Date |
| --- | --- | --- |
| 869,400 | Weldon | Oct. 29, 1907 |
| 1,186,412 | Maple | June 6, 1916 |
| 1,227,366 | Bazinet | May 22, 1917 |
| 1,228,230 | Muller | May 29, 1917 |
| 1,497,202 | Belden | June 10, 1924 |
| 1,553,739 | Belden | Sept. 15, 1925 |
| 1,608,346 | Stifle | Nov. 23, 1926 |
| 1,663,789 | Anderson | Mar. 27, 1928 |
| 1,786,049 | Zoeller | Dec. 23, 1930 |
| 2,252,623 | Gerken | Aug. 12, 1941 |
| 2,479,355 | Hemker | Aug. 16, 1949 |
| 2,613,311 | Goff | Oct. 7, 1952 |